United States Patent [19]

Scrivens

[11] Patent Number: 4,546,571
[45] Date of Patent: Oct. 15, 1985

[54] PLANT WATERING APPARATUS

[76] Inventor: Stephen J. Scrivens, Bosley House, 6 Church St., Ledbury, Herefordshire, England

[21] Appl. No.: 469,921

[22] Filed: Feb. 24, 1983

[30] Foreign Application Priority Data

Feb. 25, 1982 [GB] United Kingdom ............... 8205545

[51] Int. Cl.$^4$ ............................................ A01G 25/00
[52] U.S. Cl. ............................................ 47/81; 47/64; 47/66
[58] Field of Search .................. 47/81, 82, 83, 85, 64, 47/66, 79; 137/386, 429, 430, 397; 294/16; D7/2

[56] References Cited

U.S. PATENT DOCUMENTS

| | | | |
|---|---|---|---|
| 2,847,243 | 8/1958 | Hare | 294/16 |
| 3,055,387 | 9/1962 | Eagar | 137/423 |
| 3,352,057 | 11/1967 | Ferrand | 47/62 |
| 3,552,058 | 1/1971 | Fici | 47/79 |
| 3,757,317 | 9/1973 | Kahn et al. | 137/386 |
| 3,972,419 | 8/1976 | Short | D7/2 |
| 4,107,875 | 8/1978 | Bordine | 47/62 |
| 4,161,188 | 7/1979 | Jorgensen | 137/386 |
| 4,226,048 | 10/1980 | Molnar | 47/81 |
| 4,279,101 | 7/1981 | Leroux | 47/64 |

FOREIGN PATENT DOCUMENTS 7317395 6/1975 Netherlands ............... 47/81

Primary Examiner—Robert A. Hafer
Assistant Examiner—Bradley M. Lewis
Attorney, Agent, or Firm—Young & Thompson

[57] ABSTRACT

Plant watering apparatus comprises a trough incorporating a water reservoir, and a number of separate growing units each of which is removably received within the trough and is provided with a hollow portion which is filled with growing medium and extends into the water reservoir, when the growing unit is installed within the trough, so that water is supplied from the reservoir to the growing unit by capillary action. A ballcock is provided for controlling the water level in the reservoir.

8 Claims, 5 Drawing Figures

PLANT WATERING APPARATUS

BACKGROUND OF THE INVENTION

This invention relates to apparatus for watering plants, particularly interior plants.

Self-watering systems for houseplants are known in which water is automatically supplied to the plant by capillary action from a water reservoir in the base of the plant container, either by way of a wick or by way of a tube filled with growing medium which extends into the reservoir. However, such systems may not be suitable for large displays of plants which are to be installed in locations which can only be reached by ladder, due to the weight of the ready-planted container.

It is an object of the invention to provide a new and improved self-watering system which enables plants to be installed in difficult situations, and which moreover enables such plants to be regularly serviced.

SUMMARY OF THE INVENTION

According to the invention plant watering apparatus comprises a trough incorporating a water reservoir, and a plurality of growing units each of which is adapted to be removably received within the trough and is provided with a respective wick or portion to be filled with growing medium which extends into the water reservoir for supplying water to the growing unit by capillary action, when the growing unit is installed within the trough.

Such a system enables the trough to be installed in its intended location with the growing units removed and empty of water, so that, provided the trough is of reasonable length, it can be lifted into position by one person possibly using a ladder but without requiring a special lifting device. Once the trough is in position the reservoir can be filled with water and the ready planted growing units can be placed in the trough one at a time. The plants may be directly introduced into the growing units at the nursery which avoids the need for planting on site which may be inconvenient and possibly even hazardous.

In a preferred arrangement each of the growing units is suspended from the sides of the trough, for example by means of an outwardly extending flange on the growing unit which overlies the sides of the trough, when the growing unit is installed within the trough. In addition each growing unit is preferably provided with a handle, which may be detachable from the growing unit, for enabling the growing unit to be lowered into the trough.

It is particularly advantageous if each of the growing units is formed with at least one downwardly extending portion which is filled with growing medium when the growing unit is planted and which extends into the water reservoir when the growing unit is installed within the trough, and if each of the growing units is capable of standing upright on a flat surface when removed from the trough. If necessary each of the growing units may be provided with one or more legs in addition to the or each downwardly extending portion to enable the unit to be stood upright.

It is advantageous if the apparatus incorporates means for automatically recharging the water reservoir. Such means may be controlled by a conventional ball valve. However, plants often benefit from a period of drying out and this is not possible with such valves since the water level in the reservoir will be automatically topped up immediately it falls.

The invention also provides plant watering apparatus comprising a water reservoir, supply means for supplying water to the reservoir, and control means for controlling the supply means such that the supply of water to the reservoir is initiated only after the water in the reservoir has fallen below a first predetermined level and the supply of water to the reservoir is subsequently cut off only after the water in the reservoir has risen to a second predetermined level substantially above the first predetermined level.

DETAILED DESCRIPTION OF THE PREFERRED EMBODIMENTS

Figure 1:
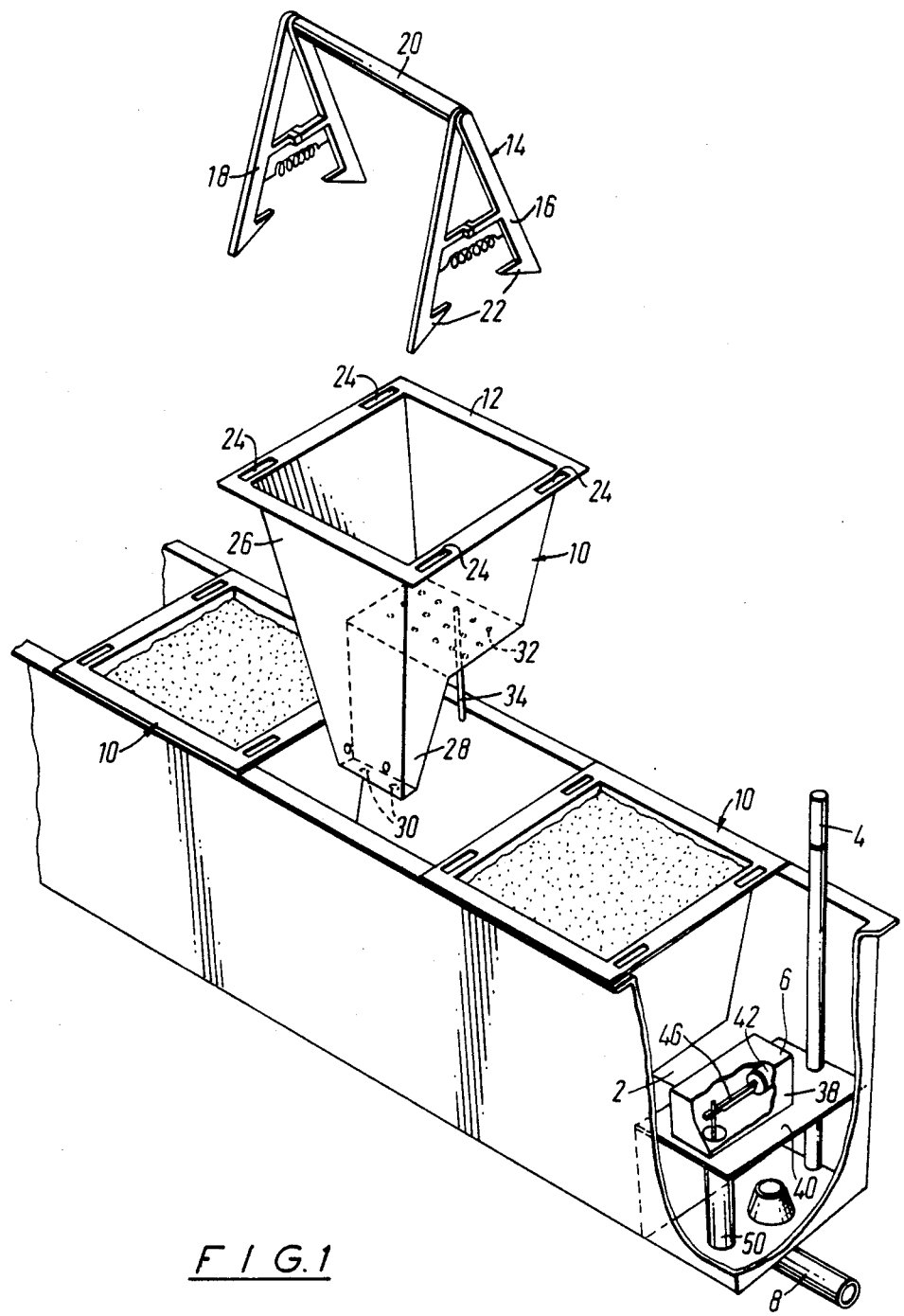
FIG. 1 is a partially cut-away perspective view of apparatus in accordance with the invention.

Referring to FIG. 1 a water reservoir 2 is provided within a trough 1 for displaying houseplants and is fitted with a pipe 4 for the supply of water to the reservoir 2 and a control mechanism 6 for controlling the level of water in the reservoir 2. An overflow pipe 8 is also fitted to the water reservoir 2. The trough 1 is capable of accommodating a plurality of growing units 10 which are suspended side by side by means of outwardly extending flanges 12 which overlie the sides of the trough 1. The units 10 are capable of being individually lowered into the trough 1 after the trough 1 has been installed in its intended position and after each of the units 10 has been planted.

To this end a detachable lifting handle 14 may be provided which comprises two pairs of sprung jaws 16 and 18 attached to opposite ends of a yoke member 20. The handle 14 may be attached to one of the growing units 10 by forcing the jaws 16 and 18 apart, passing the hooked ends 22 of the jaws through slots 24 in the flange 12 and releasing the jaws to enable the hooked ends 22 to engage the undersurface of the flange 12. The handle 14 may be detached from the growing unit 10 in a similar manner after the growing unit 10 has been lowered into the trough 1 and may then be used for lifting a further unit 10 into the trough 1. Alternatively handles may be provided which are permanently attached to the growing units 10 and which can be folded flat against the flanges 12 when not in use.

Each of the growing units 10 comprises a tapering plant container 26 of generally square crosssection integrally formed with a hollow wedge-shaped portion 28 constituting a downward extension of one side of the container 26. When the container 26 is planted the wedge-shaped portion 28 will be filled with growing medium, and, when the growing unit 10 is introduced into the trough 1, this portion 28 will extend into the water reservoir 2. Water will enter the growing medium within this portion 28 by way of holes 30 and will be lifted upwardly within the growing medium to the level of the root ball by capillary action. Air holes 32 are provided in the bottom of the container 26 above the water level in the reservoir 2 in order to ensure good ventilation of the root system. A standing leg 34 enables the container 26 to be stood upright on a flat surface when not supported by the trough 1, for example during planting.

The downwardly extending portion 28 may be of any cross-section and may project from any part of the base of the container 26, although it is found to be convenient to have it constitute a downward extension of one side of the container 26 as this leaves a free passage along one side of the reservoir 2 for any pipes to be run through the trough 1. However, it is also possible for the downwardly extending portion 28 to be dispensed with entirely and for the container 26 to be irrigated by means of a glass-fibre or other synthetic fibre wick which extends through the base of the container 26 into the water reservoir 2.

Figure 2:
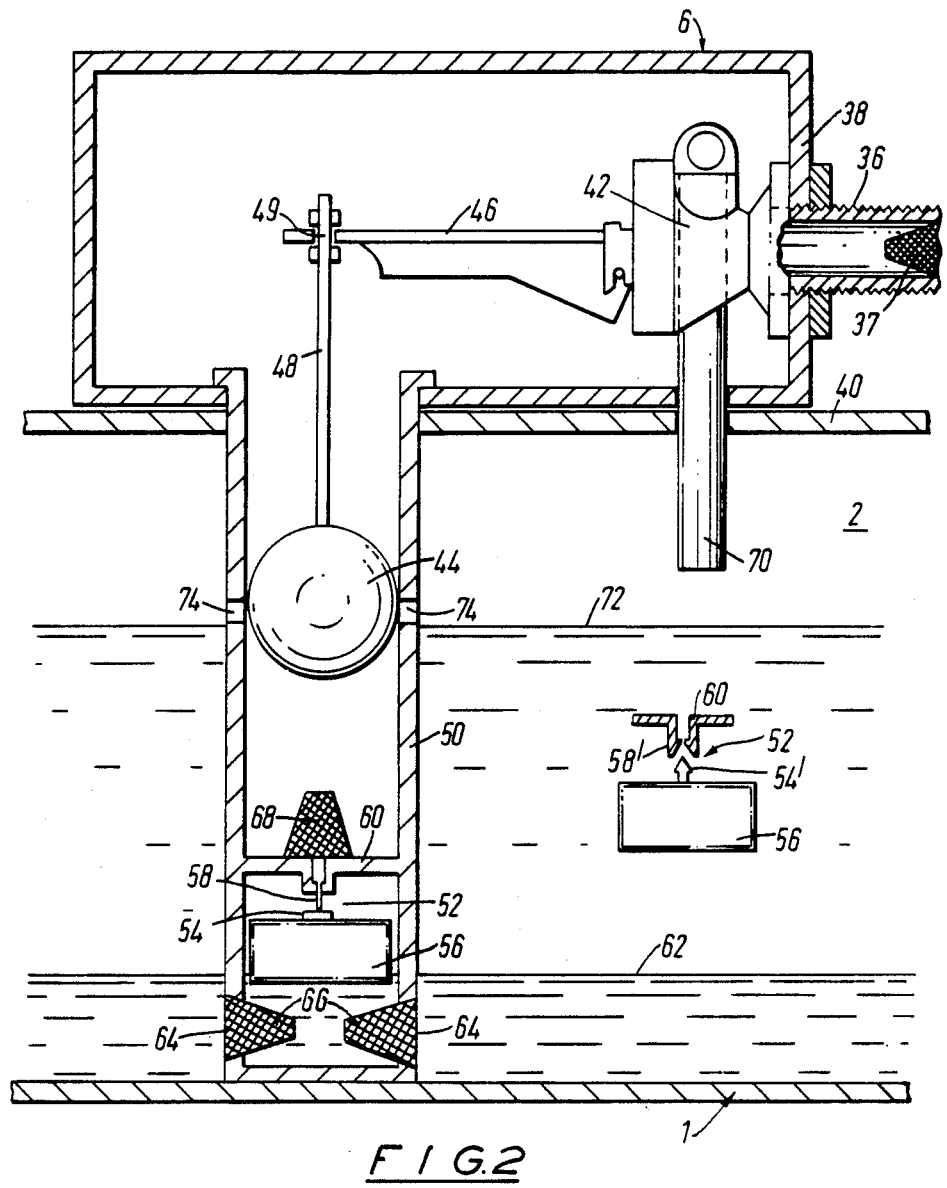
FIG. 2 shows a section through a detail of FIG. 1.

FIG. 2 shows the control mechanism 6 for controlling the water level in the reservoir 2 in more detail. An inlet pipe 36 provided with a filter 37 to remove particulate matter extends through one wall of a housing 38 supported on a platform 40 and is connected to a primary valve 42, for example a so-called "Torbeck II" valve, having its movable member (not shown) coupled to a primary float 44 by two rods 46 and 48 connected together by an articulated joint 49. The float 44 is accommodated within a tube 50 extending between the housing 38 and the bottom of the reservoir 2 and incorporating a secondary valve 52 comprising a rubber pad 54 or needle 54' (see inset on figure) mounted on a secondary float 56 and a fine hollow tube 58 or valve setting 58' in a wall 60 extending across the tube 50.

Normally the secondary valve 52 is closed and the primary float 44 is supported by a column of water within the tube 50 in the position shown in FIG. 2 in which the primary valve 42 is closed. However, when the water in the reservoir 2 falls below a first predetermined level 62, the secondary float 56 drops the secondary valve 52 is opened to allow water to flow out of the tube 50 into the surrounding reservoir 2 by way of apertures 64 provided with filters 66 in the sides of the tube 50. This allows the primary float 44 to drop to the level of a filter 68 in the vicinity of the secondary valve 52, thus opening the primary valve 42 and causing water to be supplied to the reservoir 2 by way of a down pipe 70.

Immediately the water level in the reservoir 2 begins to rise the secondary valve 52 is closed so that the primary float 44 remains in its lowermost position, and hence the primary valve 42 remains open, whilst the water level in the reservoir 2 rises. Only when the water in the reservoir 2 reaches a second predetermined level 72 substantially above the first predetermined level 62 does the upper part of the tube 50 begin to fill with water by way of apertures 74 in the sides of the tube 50. This causes the primary float 44 to rise again and the water supply is cut off when the float 44 reaches the position shown in the figure.

Such a control mechanism 6 is advantageous since it allows the moisture content of the growing medium within the growing units 10 to fall as the water level in the reservoir 2 falls, the water level only being recharged after the plants have benefited from a period of drying out.

Figure 3:
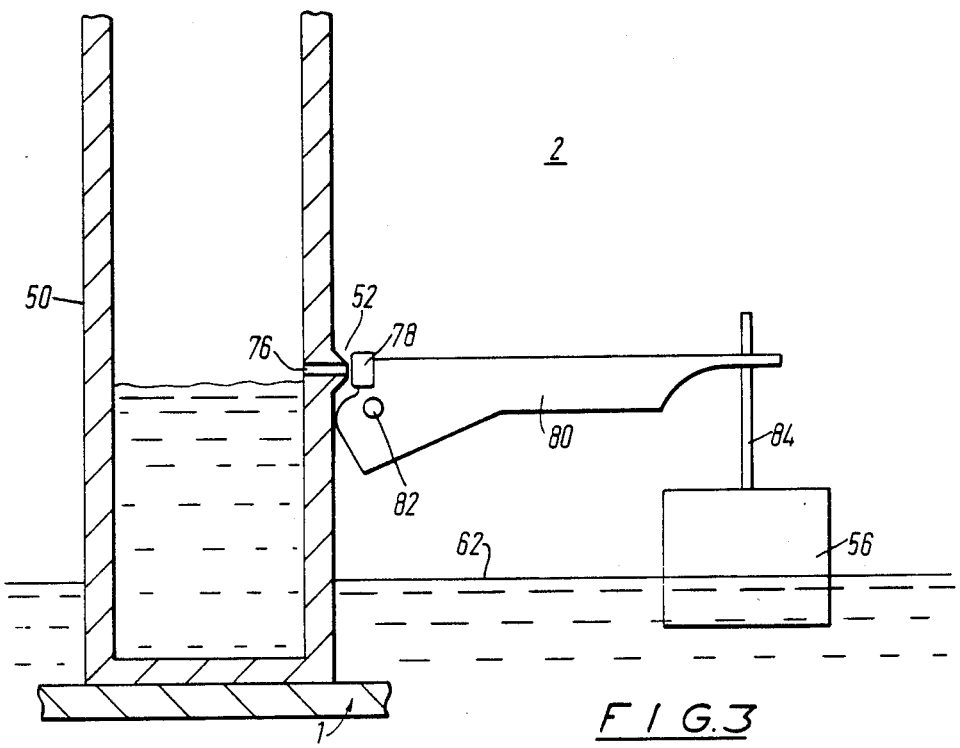
FIG. 3 shows a modification of the construction of FIG. 2.

FIG. 3 shows part of a modification of the above described control mechanism 6 in which the secondary valve 52 comprises a valve seating 76 extending through the side wall of the tube 50 and a rubber pad 78 provided on a valve member 80 for bearing against the valve seating 76 to close the valve 52. The valve member 80 is pivoted at 82 and connected to the secondary float 56 by a rod 84. When the water in the reservoir 2 falls below the first predetermined level 62 the valve member 80 pivots clockwise to open the secondary valve 52 and water flows out of the tube 50 into the surrounding reservoir 2 by way of the open valve 52. This causes the primary float 44 to drop, thereby opening the primary valve 42 and filling the reservoir 2. As the reservoir 2 fills the secondary valve 52 is closed as a result of the valve member 80 pivoting counterclockwise, the water supply to the reservoir 2 only being cut off, as previously described, when the water level in the reservoir 2 reaches the second predetermined level 72 and the tube 50 is filled with water by way of the apertures 74.

Figure 4:
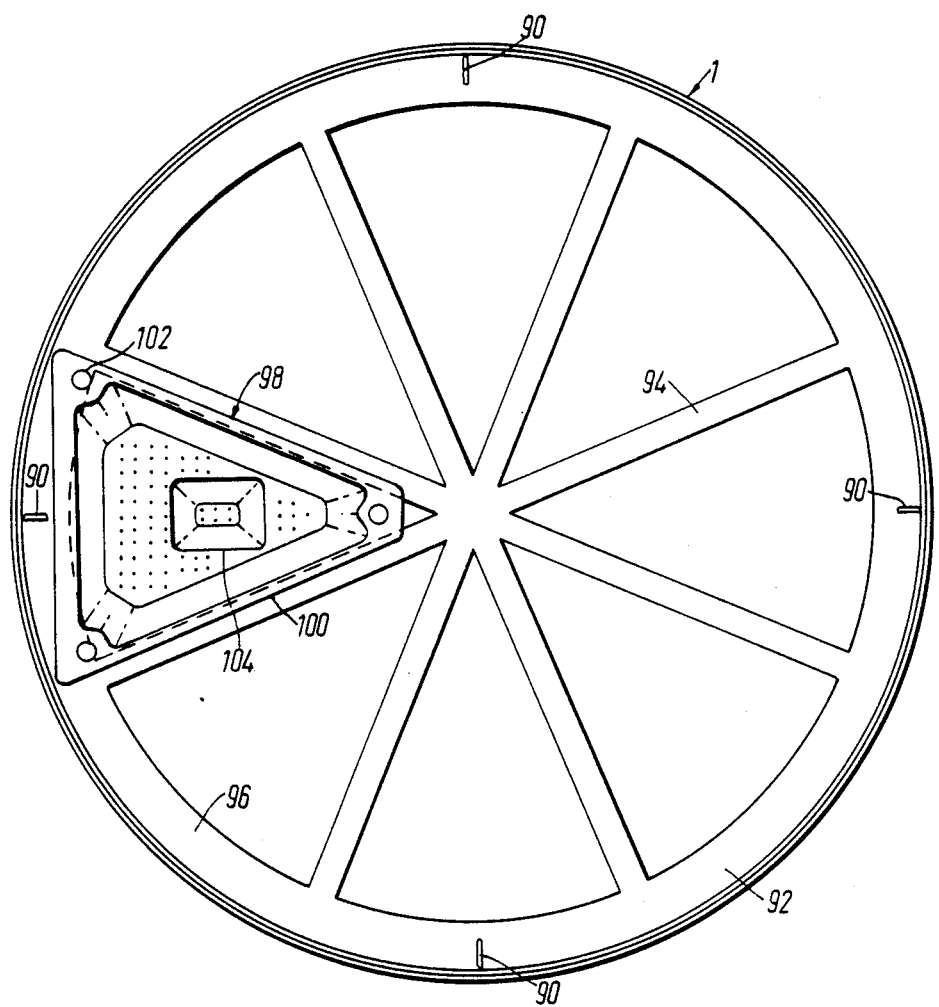
FIG. 4 shows a view from above of a further embodiment of the invention.

FIG. 4 is a view from above of a further embodiment of the invention in which the trough 1 is of substantially hemispherical form and is of a type intended to be suspended by an arrangement of flexible members (not shown) from a point immediately above the centre of the trough 1. To this end the trough 1 is provided with four supporting eyes 90 by means of which the flexible elements may be attached to the trough 1. Furthermore the upper portion of the trough 1 incorporates a cartwheel-shaped supporting member 92 fixedly attached to the remainder of the trough 1, for example by means of an adhesive, and comprising eight spokes 94 which radiate outwardly from the centre of the trough 1 and a peripheral portion 96.

The trough 1 is capable of accommodating eight growing units 98 of generally triangular shape as viewed from above, only one of these units 98 being shown in position in FIG. 4. The units 98 are suspended by means of outwardly extending flanges 100 which overlie the spokes 94 and peripheral portion 96 of the supporting member 92. Circular apertures 102 are provided in the flanges 100 for engagement with a detachable lifting handle (not shown) in a manner which is substantially similar to the lifting arrangement described with reference to FIG. 1.

Figure 5:
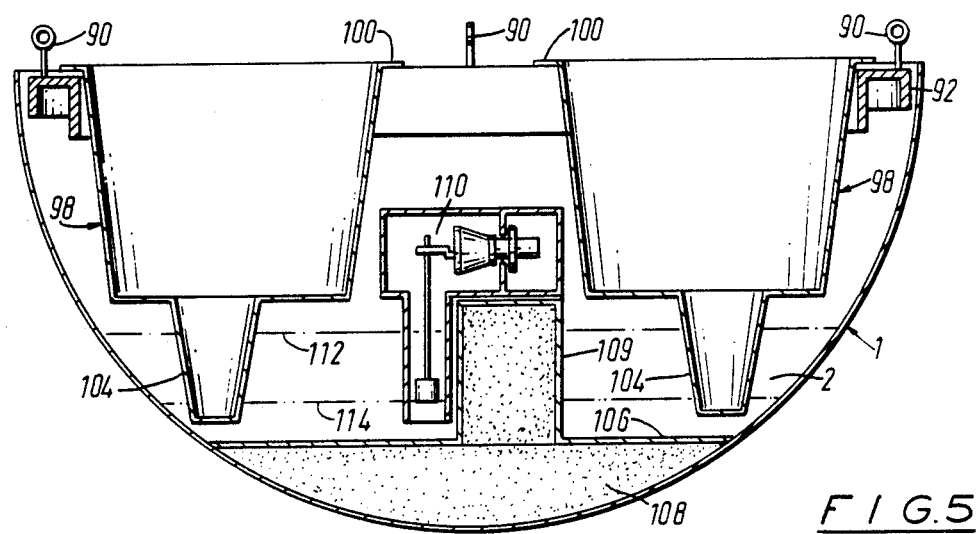
FIG. 5 is a section through the apparatus of FIG 4.

As will be appreciated from referring to FIG. 5 which shows a diametrical section through the hemispherical trough 1, each of the growing units 98 is of a basically similar form to the growing units 10 of FIG. 1 in that each unit 98 includes an integral downwardly extending portion 104 which is filled with growing medium in use and which extends into the water reservoir 2 within the trough 1. However, in this case, the downwardly extending portion 104 is substantially centrally positioned with respect to the cross-section of the container, rather than forming a downward extension of one side of the container as in FIG. 1. This enables the growing unit 98 to be stood upright on a flat surface when it is removed from the trough, without any auxiliary support being necessary.

The bottom of the trough 1 shown in FIGS. 4 and 5 incorporates a bottom wall 106, the void 108 beneath this bottom wall 106 being filled with a foamed plastics material. Furthermore the bottom wall 106 incorporates a raised portion 109 supporting a water level control assembly 110 which incorporates a miniature ballcock assembly for controlling the water level in the reservoir 2 so that it is at all times between a maximum level 112 and a minimum level 114.

I claim:

1. Plant watering apparatus comprising a trough incorporating a water reservoir, the trough terminating upwardly in upper edges and at least one plant container removably received within the trough and suspended on said upper edges at the top of the trough by means of an outwardly extending flange at the top of the container such that a downwardly extending integral portion of the container, which is of substantially smaller cross-section than the remainder of the container and is provided to be filled with a capillary medium when the container is planted, hangs down into the water reservoir to supply water to the plant within the container from the water reservoir by capillary action when the container is planted and installed within the trough, said at least one container being provided with at least one leg in addition to the downwardly extending portion to enable the unit to be stood upright on said downwardly extending portion and said at least one leg.

2. Apparatus according to claim 1, wherein the or each container is provided with a handle for enabling the container to be lowered into the trough.

3. Apparatus according to claim 2, wherein the handle is detachable from the container.

4. Apparatus according to claim 1, wherein the or each container is capable of standing upright on a flat surface when removed from the trough.

5. Apparatus according to claim 1, incorporating recharging means for automatically recharging the water reservoir.

6. Apparatus according to claim 5, wherein the recharging means is controlled by a ball valve.

7. Apparatus according to claim 1, wherein the trough is of substantially hemispherical form and is adapted to be suspended from above.

8. Apparatus according to claim 7, wherein the trough incorporates spokes radiating outwardly from the centre of the trough for supporting a plurality of plant containers at respective angular positions with respect to said centre.

* * * * *